United States Patent
Newton et al.

(10) Patent No.: US 8,038,364 B2
(45) Date of Patent: Oct. 18, 2011

(54) REINFORCEMENT FOR ASPHALTIC PAVING, METHOD OF PAVING, AND PROCESS FOR MAKING A GRID WITH THE COATING FOR ASPHALTIC PAVING

(75) Inventors: Mark J. Newton, Perkinsfield (CA); Gary R. Fague, Canandaigua, NY (US); Sugjoon Lee, Westborough, MA (US); Jon Woolstencroft, St. Catharines (CA); Richard Goupil, Williamsville, NY (US); Kerry Hook, East Amherst, NY (US)

(73) Assignee: Saint-Gobain Technical Fabrics America, Inc., Grand Island, NY (US)

( * ) Notice: Subject to any disclaimer, the term of this patent is extended or adjusted under 35 U.S.C. 154(b) by 326 days.

(21) Appl. No.: 12/186,222

(22) Filed: Aug. 5, 2008

(65) Prior Publication Data
US 2009/0097917 A1   Apr. 16, 2009

Related U.S. Application Data

(60) Provisional application No. 60/954,415, filed on Aug. 7, 2007.

(51) Int. Cl.
*E01C 11/16*   (2006.01)
(52) U.S. Cl. .................. 404/17; 404/31; 404/72; 404/75
(58) Field of Classification Search .................... 404/17, 404/18, 31, 32, 75–77, 82, 95, 100
See application file for complete search history.

(56) References Cited

U.S. PATENT DOCUMENTS

| | | | |
|---|---|---|---|
| 4,306,591 A | 12/1981 | Arterburn | |
| 4,359,546 A | 11/1982 | Bershas | |
| 4,425,399 A | 1/1984 | Bershas | |
| 4,673,616 A | 6/1987 | Goodwin | |
| 4,684,689 A | 8/1987 | Yannich et al. | |
| 4,699,542 A | 10/1987 | Shoesmith | |
| 4,722,953 A | 2/1988 | DeRuiter et al. | |
| 4,957,390 A | 9/1990 | Shoesmith | |
| 5,110,627 A * | 5/1992 | Shoesmith et al. | 427/208.4 |
| 5,246,306 A | 9/1993 | Shoesmith et al. | |
| 5,254,661 A | 10/1993 | Wilson | |

(Continued)

FOREIGN PATENT DOCUMENTS

DE   102004015329 A1   10/2005

(Continued)

OTHER PUBLICATIONS

PCT Search Report mailed on Jan. 30, 2009 for PCT/US2008/072347 (Filed Aug. 6, 2008). KIPO.

(Continued)

*Primary Examiner* — Raymond Addie
(74) *Attorney, Agent, or Firm* — Duane Morris LLP; Steven E. Koffs

(57) ABSTRACT

A composite material comprises: an open grid comprising at least two sets of strands. Each set of strands has openings between adjacent strands. The sets are oriented at a substantial angle to one another. A tack film is laminated to the open grid. The tack film has first and second major surfaces, such that a material of the tack film at its first and second major surfaces is a material including about 50% or more of resinous non-asphaltic component and about 50% or less of asphaltic component.

28 Claims, 10 Drawing Sheets

U.S. PATENT DOCUMENTS

| | | | |
|---|---|---|---|
| 5,356,466 | A | 10/1994 | Lawson |
| 5,393,559 | A | 2/1995 | Shoesmith et al. |
| 5,667,889 | A | 9/1997 | Katsura et al. |
| 5,756,214 | A | 5/1998 | Waldron et al. |
| 6,139,955 | A | 10/2000 | Girgis |
| 6,359,058 | B1 | 3/2002 | Clarke et al. |
| 6,648,547 | B2 | 11/2003 | Jones et al. |
| 6,764,741 | B2 | 7/2004 | Kawasumi et al. |
| 6,897,256 | B1 | 5/2005 | Dreher et al. |
| 6,924,015 | B2 | 8/2005 | Zanchetta et al. |
| 7,008,987 | B2 | 3/2006 | Okada et al. |
| 7,232,276 | B2 | 6/2007 | Oka et al. |
| 2001/0031594 | A1 | 10/2001 | Perez et al. |
| 2006/0292367 | A1 | 12/2006 | Seol et al. |
| 2010/0283072 | A1 | 11/2010 | Kazlas et al. |

FOREIGN PATENT DOCUMENTS

| | | |
|---|---|---|
| DE | 202005002794 U1 | 7/2006 |
| EP | 1693517 A2 | 4/2007 |
| JP | 03-17034 A | 1/1991 |
| JP | 07-138910 | 5/1995 |
| KR | 10-06690979 B1 | 1/2007 |

OTHER PUBLICATIONS

PCT Search Report mailed on Jan. 30, 2009 for PCT/US2008/072353 (Filed Aug. 6, 2008). KIPO.

PCT Search Report mailed on Feb. 10, 2009 for PCT/US2008/072339 (Filed Aug. 6, 2008). KIPO.

Office Action Sep. 1, 2010 for corresponding Australian Application No. 2008283888.

Saint-Gobain Technical Fabrics "Glasgrid Technical Manual: Advanced fiber glass technology for asphalt pavement" 2002. Copyright Sep. 2002.

Archer, Stephen. "Tensar International Expands Pavement Reinforcement Product Line: Company Adds GlasPave Waterproof Paving Mat, New from Saint-Gobain Technical Fabrics." Mar. 14, 2008 Tensar International Press Release.

"The New Generation of Armapal is Here! Asphalt Resurfacing with Magischem Plus." REHAU Unlimited Polymer Solutions.

Saint-Gobain Technical Fabrics."About: Products: GlasGrid Pavement Reinforcement Grid." http://www.glassgrid.com/Products/. Printed Nov. 16, 2005.

Saint-Gobain Technical Fabrics. "NEW from Saint-Gobain: GlasPave 25." Copyright Oct. 2007.

Owens Corning. "TruPave Engineered Paving Mat." http://www.owenscorning.com/trupave/ Visited Jun. 23, 2008. Source Publication Date: Fri, Dec. 31, 2003.

Saint-Gobain Technical Fabrics. "Laid Scrim" http://www.sgtf.com/Home/Products/Technology/TLaidScrim/ Visited Oct. 29, 2008.

Saint-Gobain Technical Fabrics. "Lamination" http://www.sgtf.com/Home/Products/Technology/TBamilex/ Visited Oct. 29, 2008.

Office Action Nov. 10, 2010 for corresponding Australian Application No. 2008283894.

Office Action of Feb. 2, 2011 in U.S. Appl. No. 12/186,247, six pages.

Office Action of Mar. 31, 2011 in U.S. Appl. No. 12/186,263, 11 pages.

"Release agent gives uniform gloss", Plastics Technology; Nov. 2003, 49, 11; ABI/INFORM, Trade & Industry, p. 22.

Office Action dated Aug. 3, 2011, in related U.S. Appl. No. 12/186,263.

Office Action dated Jul. 2, 2011, in related U.S. Appl. No. 12/186,247.

Dictionary.com, Definition of "film", retrieved Jul. 29, 2011.

* cited by examiner

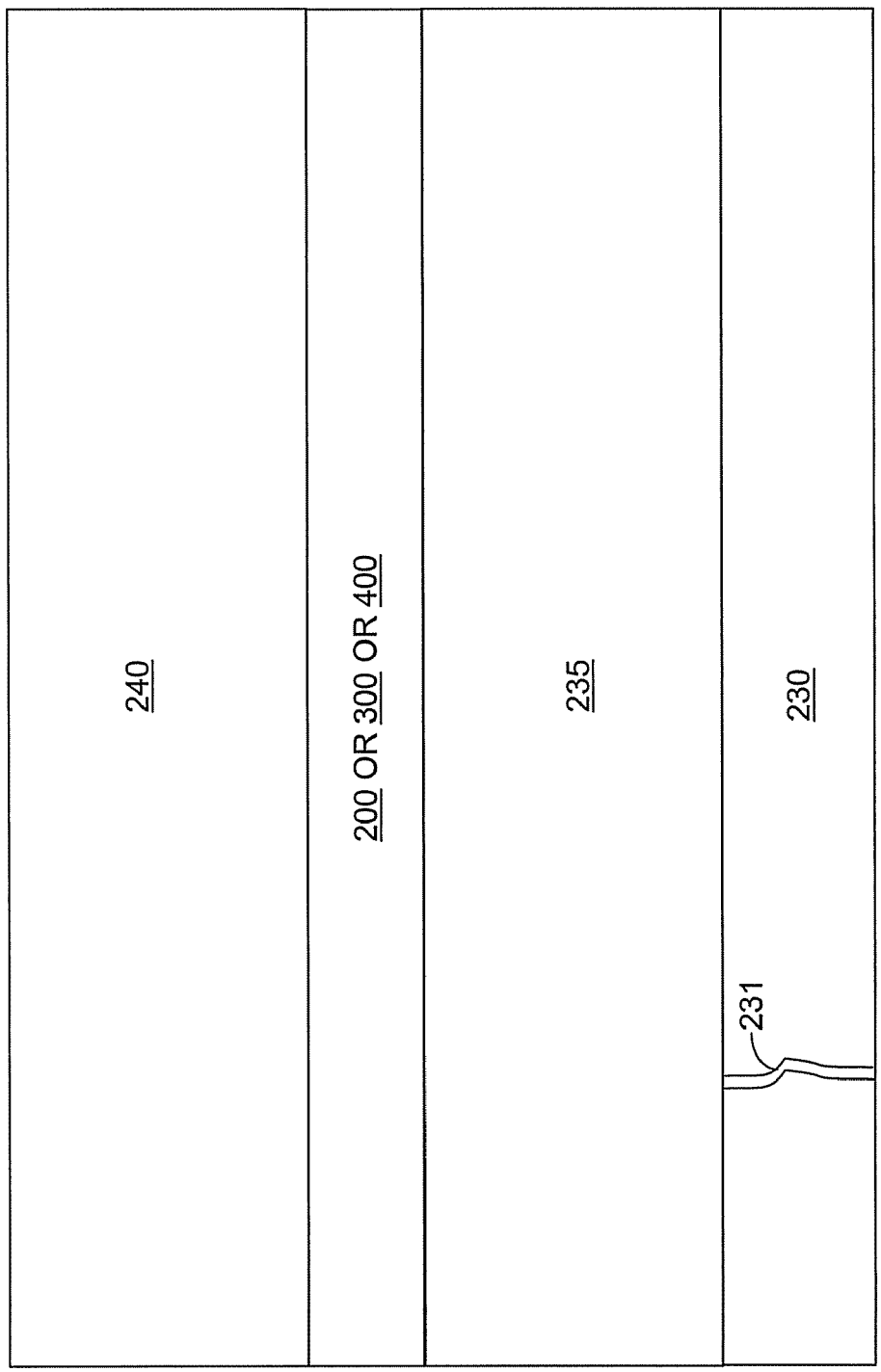

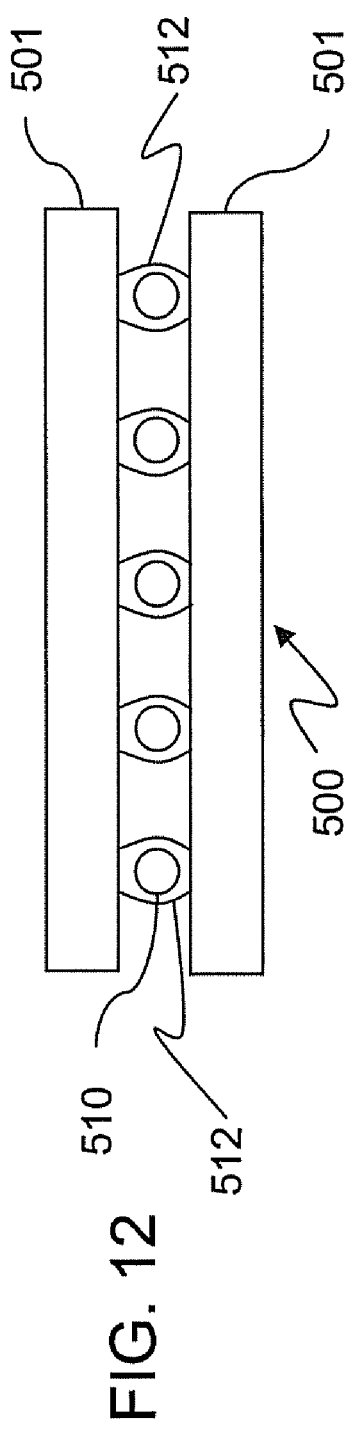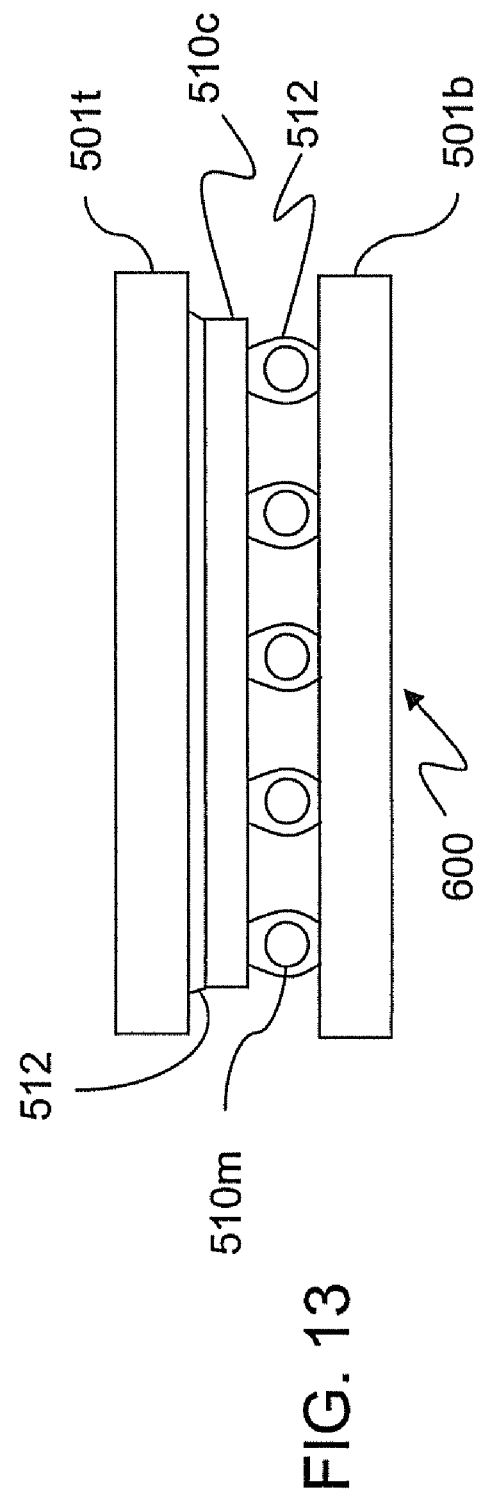

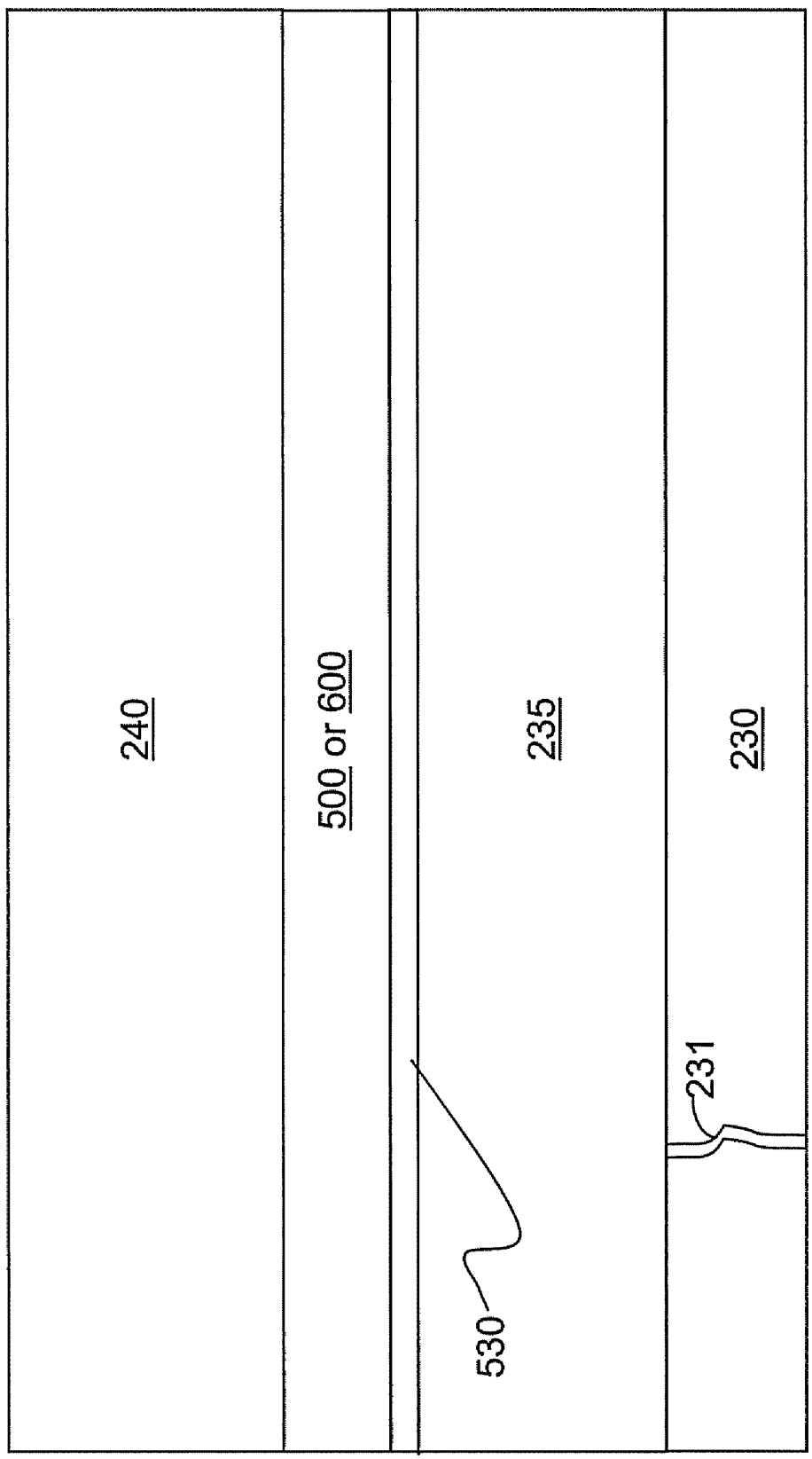

REINFORCEMENT FOR ASPHALTIC PAVING, METHOD OF PAVING, AND PROCESS FOR MAKING A GRID WITH THE COATING FOR ASPHALTIC PAVING

This application claims the benefit of U.S. Provisional Patent Application No. 60/954,415, filed Aug. 7, 2007.

FIELD OF THE INVENTION

The present invention relates to reinforcement materials for pavement repairs.

BACKGROUND OF THE INVENTION

Various methods and composites for reinforcing asphaltic roads and overlays have been proposed. Some describe fiberglass grids impregnated with resins. To repair an old pavement, an asphaltic tack coat is generally applied with fiberglass grids according to the construction regulations. The tack coat is applied as a liquid (for example, as an emulsion or hot asphalt cement binder by spraying), and thereafter changes from a liquid to a solid. The tack coat is applied on top of the installed grid with adhesive coating on the back of the grid, used as an aid in bonding a new asphalt payment to the existing pavement surface. In order to install fiberglass grids without adhesive coating on the back of the grid, the tack coat is firstly applied to an existing pavement. Before the tack coat is fully cured, the grid is laid on the tack coat. As the tack coat cures further, it holds the grid in place on the underlying pavement. The tack coat partially dissolves and merges with the impregnating resin in the grid, when hot asphalt concrete is overlaid on top of the grid. Tack coats have several highly desirable features for use with such reinforcements. In particular, they are completely compatible with the asphaltic concrete or cement to be used as the overlay, and their fluid nature makes them flow into, and smooth out, rough paving surfaces.

On the other hand, tack coats present several difficulties. The properties of tack coats are very sensitive to ambient conditions, particularly temperature, and humidity. These conditions may affect cure temperature of emulsion tack coats, and in severe conditions, they can prevent cure. In less severe circumstances, the overlay paving equipment must wait until the tack coat has cured, causing needless delays. For example, tack coats are normally emulsions of asphalt in water, often stabilized by a surfactant. To manifest their potential, the emulsion must be broken and water removed to lay down a film of asphalt. The water removal process is, essentially, evaporation, which is controlled by time, temperature, and humidity of the environment. Frequently, the environmental conditions are unfavorable, resulting in inefficient tacking or unacceptable delay.

JP 05-315732 describes an asphalt film that can be used in place of a sprayed emulsion tack coat. The asphalt film is laid over a base layer and a heated asphalt material is laid on top of the film. The film is formed by attaching asphalt emulsion to both sides of a net-like body and solidifying it. A lower base layer comprising gravel, sand, etc. and an upper base layer of crushed stone are placed on a subgrade and compacted. The film is placed on the upper base layer, and the heated asphalt material is laid on the film. Additional film and asphalt material layers are repeatedly laid on the asphalt layer. The film is softened and melted into a single body by the heat of the asphalt material.

Accordingly, there remains a desire to improve the interlaminar layer between pavement courses.

SUMMARY

In some embodiments, a reinforcement for asphaltic paving comprises: an open grid having at least two sets of substantially parallel strands, each set of strands having openings between adjacent strands, and the sets being oriented at a substantial angle to one another. A coating is disposed over the grid without closing the openings between the strands. The coating is activated at a paving temperature, pressure, or both, to form a bond compatible with asphaltic paving. The coating is not tacky at an ambient temperature and pressure. The coating comprises about 50% or more resinous non-asphaltic component and about 50% or less of asphaltic component.

In some embodiments, a method is provided for reinforcing paving in which a second layer of paving is placed on top of a first layer of paving. An open grid is provided, comprising at least two sets of substantially parallel strands, each set of strands having openings between adjacent strands, and the sets being oriented at a substantial angle to one another. A coating is disposed over the grid without closing the openings between the strands. The coating is activated at a paving temperature, pressure, or both, to exhibit plastic flow and form a bond compatible with asphaltic paving. The coating is not tacky at an ambient temperature and pressure. The coating comprises about 50% or more resinous non-asphaltic component and about 50% or less of asphaltic component. The grid is continuously unrolled over the first layer of paving, while maintaining the respective strands of the grid in substantially parallel alignment. The coating is activated by applying the second layer of paving on top of the first layer of paving. The second paving layer passes through openings in the grid, so that the grid openings provide for significant and substantial direct contact between the first and second paving layers. The activation causes said coating to plastically flow to improve the interlaminar bond between said first and second layers of paving.

In some embodiments, a process for making a reinforcement for asphaltic paving comprises providing an open grid including at least two sets of parallel strands of continuous filament fibers. The grid has openings between adjacent strands and the two sets of strands are substantially perpendicular to each other. The strands of the grid are impregnated with a binder resin. A coating is applied to the resin-impregnated grid. The coating comprises a thermoplastic resin which plastically flows at a paving temperature, pressure, or both.

In some embodiments, a method of reducing reflective cracking in paving comprises applying an asphaltic binder course having a thickness of at least about 0.75 inches (19 mm) to an existing road surface. A grid is applied to the asphaltic binder course. The grid has at least two sets of substantially parallel strands, each set of strands having openings between adjacent strands, and the sets being oriented at a substantial angle to one another. A coating is disposed over the grid without closing the openings between the strands. The coating is activated at a paving temperature, pressure, or both, to form a bond compatible with asphaltic paving. The coating comprises a thermoplastic resin which plastically flows at a paving temperature, pressure, or both, but which is not tacky at an ambient temperature and pressure. The coating comprises a non-asphaltic material or a material including a majority or plurality resinous non-asphaltic component and about 50% or less of asphaltic component. An asphaltic surface course is applied over the grid, asphaltic binder course and said existing road surface. The asphaltic surface course has a thickness of at least about 1.5 inches (40 mm). The thermoplastic resin plastically flows to improve the interlaminar bond between said asphaltic binder course and the asphaltic surface course. The shear strength in a four inch puck, including the grid, the asphaltic binder course, and the asphaltic surface course is at least about 1 kN.

In some embodiments, a product comprises first and second non-woven polymer substrates. A layer of reinforcing fibers is sandwiched between the non-woven polymer substrates. An adhesive joins the layer of reinforcing fibers to the non-woven substrates. The adhesive is activated at a paving temperature, pressure, or both, to form a bond compatible with asphaltic paving, said adhesive comprising 50-99 wt. % PVC latex emulsion.

In some embodiments, a method for forming a reinforcing product comprises the steps of: coating a layer of reinforcing fibers with an adhesive comprising 50-99 wt. % PVC latex emulsion; and laminating the layer of reinforcing fibers to first and second non-woven polymer substrates.

BRIEF DESCRIPTION OF THE DRAWINGS

The accompanying drawings illustrate preferred embodiments of the invention, as well as other information pertinent to the disclosure, in which:

FIG. 6 is a partial cross-sectional side view of a repaired section of asphaltic pavement including the tack film—reinforcement composite material of any of FIGS. 3-5.

FIG. 12 is a cross-sectional view of another embodiment of a reinforcement.

FIG. 13 is a cross-sectional view of a variation of the embodiment of FIG. 12.

FIG. 15 is a cross-sectional view of a section of paving repaired with the reinforcement of FIG. 12 or 13.

DETAILED DESCRIPTION OF THE INVENTION

Figure 1:
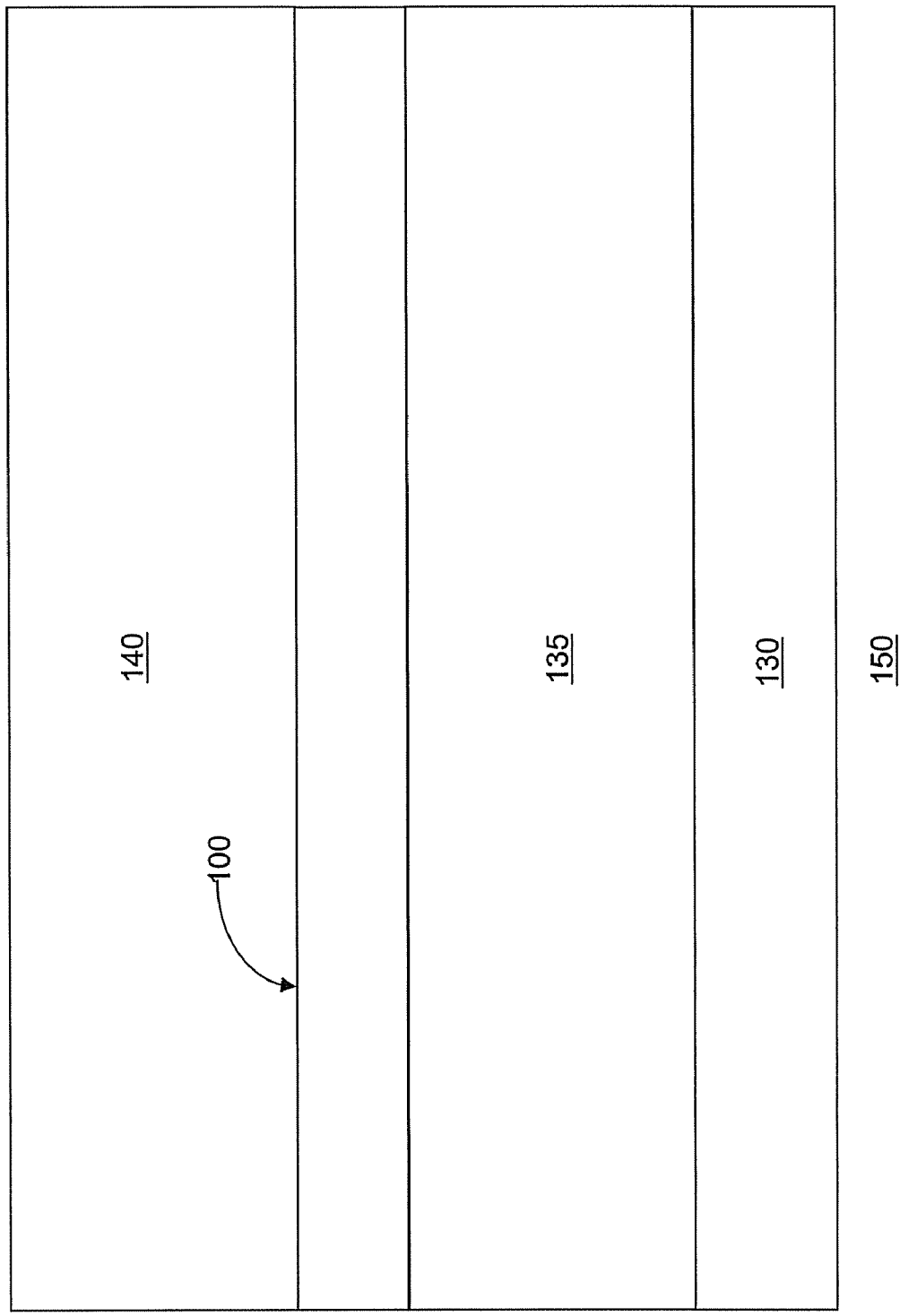
FIG. 1 is a partial cross-sectional side view of a repaved section of asphaltic pavement according to one example.

This application incorporates by reference U.S. Provisional Patent Application No. 60/954,415, filed Aug. 7, 2007, in its entirety as though fully set forth herein.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Examples below describe a self adhesive tack film for asphaltic paving, processes for making the film, and methods of forming pavement, in which a second layer of paving is placed on top of a first layer of paving. As used herein, the following terms are defined:

Ambient: the surrounding environmental conditions, such as pressure, temperature, or relative humidity.

Strand: a twisted or untwisted bundle or assembly of continuous filaments used as a unit, including slivers, toes, ends, yarn and the like. Sometimes a single fiber or filament is also called a strand.

Resinous: of or pertaining to a solid or pseudo-solid organic material, usually of a high molecular weight, which exhibits a tendency to flow when subjected to stress or temperature. In its thermoplastic form, it usually has a softening or melting range. Most resins are polymers.

The words "pavings," "roads," "roadways," and "surfaces" are used herein in their broad senses to include airports, sidewalks, driveways, parking lots and all other such paved surfaces.

FIG. 1 shows an example of a pavement section 150. During the maintenance and repair of pavement 150, an asphaltic binder course 135 is overlaid on top of an existing old pavement 130, which can be concrete, asphalt, or a mixture thereof. The old pavement 130 is typically texturized, or milled down, by an abrasive roll (not shown), which provides a good gripping surface for the binder course 135. A prefabricated, resinous or resin-impregnated film 100 places on the binder course 135 and enhances bonding with surfacing course 140. This ensures interlayer bonding in the multilayered paving structure, which is desirable to decrease the stress distribution that is applied to the surface course, for example, by motor traffic.

The tack film 100 has first and second major surfaces. The material of the tack film 100 at the first and major surfaces thereof is a material that is a non-asphaltic resin, or has a composition including about 50% or more of a resin and about 50% or less asphaltic material. Preferably, the material at the surface of the tack film is not more than 25% asphaltic material, and more preferably, the material at the surface of the tack film is not more than 20% asphaltic material. In some embodiments, the tack film 100 includes a carrier substrate with a resinous, non-asphaltic material coated on the first and second major surfaces thereof, or a material comprising about 50% or more of a resinous, non-asphaltic material and about 50% or less of an asphaltic material coated on the first and second major surfaces thereof. In other embodiments, the entire tack film 100 consists essentially of, or consists of, a resinous, non asphaltic material; or the entire tack film 100 consists essentially of, or consists of a material comprising a majority or plurality portion of a resinous, non-asphaltic material and a non-zero minority portion of an asphaltic material.

In some embodiments, the tack film 100 is suitable for use as a substitute for the asphalt emulsion that is used as a bonding agent between pavement layers 135 and 140. The tack film 100 enhances interlayer bonding in the asphaltic road construction.

Because the tack film 100 is a pre-fabricated product, it allows the installer to control the application rate and thickness of the tack layer. The spraying and curing operations (that are performed in situ if an asphalt emulsion were used) can be eliminated when the tack film 100 is used. The tack film 100 expedites road construction through the elimination of these steps on the job site. The tack film 100 can provide a thickness and shear and fatigue performance that is equivalent to, or better than, that obtained with an asphalt emulsion.

Figure 2:
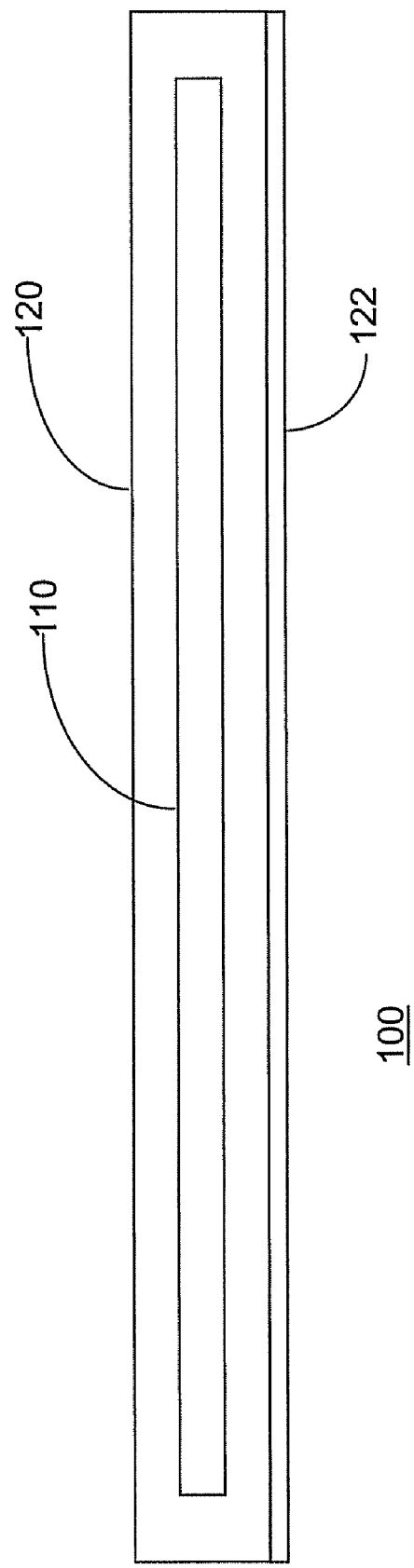
FIG. 2 is a detailed cross sectional view of one embodiment of the tack film shown in FIG. 1.

FIG. 2 shows a first example of a tack film, which may be a composite film 100. In some embodiments, as shown in FIGS. 1 and 2, a thin polymer film 110 is laid over the base layer 135, and functions as a carrier to evenly distribute resin (or a material comprising about 50% or more of polymer resin and a about 50% or less of asphaltic material) 120 of the composite tack film 100. The resin 120 (or composition of resin and asphaltic material) thoroughly covers both sides of the carrier film 110 through a coating process to form a tack composite film 100. The non-tacky smooth surfaced nature of the coating provides convenience in handling at the construction site.

An exemplary process for making a composite tack film 100 is as follows. A first step includes laying a thin resinous or resin-impregnated polymer film as carrier film 110. The thin film 110 is then coated with a polymer resin 120 (or composition of resin and asphaltic material), for example, by dipping the film in the resin or composition of resin and asphaltic material. The coated film 100 is then dried. An adhesive 122 (such as a pressure sensitive adhesive) may be applied to the backing side (bottom side after installation) of the coated film. Then the adhesive 122 is dried. The adhesive 122 keeps the film in place while the overlying surfacing course 140 is applied.

The polymeric resin (or composition of resin and asphaltic material) 120 may have a coefficient of thermal expansion (CTE) similar to that of asphalt 140. Preferably, the polymeric resin (or composition of resin and asphaltic material) has superior stability to that of asphalt 140 and 135, with higher stiffness in a broad temperature range. The composite tack film 100 is more visco-elastic than an asphalt based film. When dried, the composite film 100 has a smooth, non-tacky surface. In service, when the hot mix asphalt mixture of surface course 140 is applied on the tack composite film 100, the polymeric resin (or coating composition of resin and asphaltic material) 120 is activated to provide bonding force, and the attachment between pavement layers 135, 140 is enhanced by means of the tack composite film 100.

When an asphaltic spray emulsion was used in road construction, the installer had to try to make the asphalt emulsion coating appropriately thin and uniform for optimal performance. Use of a tack film 100 as described herein provides a predetermined thickness. The uniformity of the thickness of coating 120 can be controlled. The thickness of coating 120 can be optimized to a thickness equivalent to the optimal application rate of an asphaltic emulsion tack coating.

The tack film 100 eliminates steps for in situ spraying and curing of the asphalt emulsion. Both time and labor costs for pavement construction projects can be reduced. Further, because the in situ curing step is eliminated, the time needed to complete a given area of pavement is more predictable than when sprayed emulsion is used. By eliminating installation time unpredictability, it may be possible to eliminate slack time from the installation schedule, increasing efficiency, and further reducing project duration. Additionally, because the thickness of the film can be optimized and controlled, wastage of the tack film can be reduced. The ability to use a pre-fabricated, mass-produced composite tack film opens the door for possible reduction in material costs.

In some embodiments, the addition of an adhesive 122 on the back of the tack film 100 makes the field installation more secure. Preferably, a pressure-sensitive adhesive 122 is used, for easy installation.

In some embodiments, the carrier film 110 may comprise a polyethylene film. The carrier may have a thickness from about 0.5 mil to about 10 mil, and more preferably, carriers from about 0.5 mil to about 2 mil can be used. For example, the film 110 may be a low density polyethylene film of about 0.5 mil (0.01 mm), although other materials and thicknesses, such as a polyethylene-polypropylene copolymer film about 2-mil (0.05 mm) thick could be used. Polyethylene is an inexpensive material. Although polyethylene may shrink at a drying temperature of some resin coating materials, preferred resins protect the film 110, so that the film keeps its shape during the drying process. Other polymer films that are compatible with asphalt may be used for the carrier layer 110 (e.g., PVC, nylon (polyamide), acrylics, HDPE, and certain polypropylenes, which give the desired rigidity, compatibility, and corrosion resistance.). In other embodiments, the carrier layer may comprise a multi-layer sheet made of two or more of these materials, or one of these materials in combination with a different compatible material.

The film 110 may be perforated. Perforations increase the speed of impregnation of the resin 120 into the film 110. A network of resin (or coating composition of resin and asphaltic material) 120 can be formed on both sides of the film 110. Heat from the hot melt asphalt of the surface layer 140 transfers through the bottom of the film 110 to the lower (binder) asphaltic concrete layer 135.

In some embodiments, the non-asphaltic, resinous coating (or coating composition of resin and asphaltic material) 120 applied to the film 110 makes the tack film 100 more compatible with the surrounding asphaltic layers 135, 140. This is accomplished by carefully tailoring the chemical composition of the coating 120 so that there is plastic flow of the resin at paving temperatures, pressures, or both. Preferably, the composition of coating 120 has a glass transition temperature of greater than 68-77° F. (20-25° C.), and preferably undergoes plastic flow at temperatures above about 120-140° F. (50-60° C.). Once the temperatures of asphaltic paving are reached, i.e., about 265-320° F. (130-160° C.), flow of the coating 120 is possible under even very low pressures. In fact, paving pressure by construction compaction and the weight of the surface course 140 may effect on some flow for at least localized conformation to the surfaces which are in very close proximity. Typical temperatures of surface course 140 start out at about 250-320° F. (121-160° C.) during installation, and result in temperatures of about 140-150° F. (60-66° C.) at the inter-layer tack film 100. This is enough to heat the tack film 100 and the coating 120 on the film 110. This heat causes the coating 120 to flow and the film 110 to relax and be "ironed out", to promote a better mechanical bonding by tack film 100 to the binder course 135 and the surface course 140 of pavement 150.

The chemical nature of the coating 120 can also allow some degree of physical and/or chemical bonding due to Van der Waals attraction to any exposed aggregate, asphalt or the like.

Both the physical and chemical processes improve shear adhesion between the surface course and the binder course, improving the shear strength. In general, the thicker the coating 120, the better the shear performance, up to a maximum value that is specific to each coating material.

In another preferred embodiment, a method of reducing bending moment in asphaltic paving courses is provided. The method includes applying an asphaltic binder course 135 preferably having a thickness of about 0.75 inches (19 mm) or more to an existing road surface 130, followed by applying a composite tack film 100 to the asphaltic binder course 135. The film 100 may comprise a carrier layer 110 of polyethylene, ethylene vinyl acetate (EVA) or other suitable polymer. A resinous non-asphaltic coating (or coating composition of resin and asphaltic material) or film 120 is disposed over the carrier film 110 in composite layer 100. The coating or film (hereafter collectively referred to as "surface layer") 120 is activated (thermoplastic) at a paving temperature, pressure, or both, to form a bond compatible with asphaltic paving 135, 140. The surface layer 120 may comprise a thermoplastic resin which plastically flows at a paving temperature, pressure, or both, but which is not tacky at an ambient temperature and pressure. The method further includes applying an asphaltic surface course 140 having a thickness of about 1.5 inches (40 mm) or more over the composite tack film 100, asphaltic binder course 135 and the existing load surface 130. The pressure and heat of the surface course 140 causes the thermoplastic resin 120 to plastically flow to improve the interlaminar bond between the asphaltic binder course 135 and the asphaltic surface course 140. The interlaminar bond can be an adhesive, melt or chemical (and/or Van der Waals) bond, or a combination thereof.

In some embodiments, the surface layer 120 is an acrylic coating. In some embodiments, the surface layer 120 may comprise a polyvinyl chloride (PVC) latex emulsion coating comprising about 1-8 wt. % wax release agent, and about 0-10 wt. % additives selected from the group consisting of: soluble polymer, ammonia, thickener, carbon black, defoamer, and plasticizer. One preferred PVC latex emulsion is Vycar® 460×63 latex (vinyl emulsion) available from Noveon, Inc., Cleveland, Ohio, which provides a great degree of plastic flow at paving temperatures greater than about 120-140° F. (49-60° C.) at the coating surface. There may also be an innate level of chemical adhesion of the PVC latex polymer to asphalt.

In some embodiments, the coating comprises 40-60% Vycar® 460×63 latex, and in some embodiments, the coating comprises at least about 40% Vycar® 460×63 latex and up to about 20% asphaltic material. In some embodiments, the coating comprises 45-50% Vycar® 460×63 latex, and in some embodiments, the coating comprises at least about 45% Vycar® 460×63 latex and up to about 5% asphaltic material.

By itself, Vycar® 460×63 in known to be fairly rigid, particularly in cold weather. This could cause installation problems when the coated film 100 is applied around curves in the road. Vycar® 460×63 is also less resistant to liquid water than other resinous candidates. Since its solids level is rather low, it may be harder to get the desired pick-up level, and once absorbed, it may be more difficult to dry the fabric adequately.

Accordingly, in some embodiments, the coating 120 containing Vycar® 460×63 is formulated in such a way as to make the coating softer, and increase its solids level.

The polymer in the coating 120 can also be made from softer monomers. The water repellency issue may be cured by incorporating a wax additive such as Hydrocer 145 at a level of about 3-5 wt. % of the dry coating. This wax release agent also has a tendency of softening the coating slightly. The solids level of the coating may be improved to about 50-60 wt. %, ideally about 55 wt. % or more. In addition to these improvements to the PVC latex, a soluble polymer such as Carboset 514W, in amounts of about 5-9 wt. % of the dry coating, can be introduced to give more open time and re-wettability to the coating on the pad rolls. Other water soluble polymers, such as Michemprime polymer, may be used.

In order to activate the soluble polymer, ammonia can be added to a pH of about 8 or 9. The ammonia can also be used to activate any alkali soluble thickeners used in the composition. Such thickeners can include those commonly available, and are preferably used if the pick-up target can not be obtained. ASE-60 or 6038A from Rohm and Haas, Philadelphia, Pa., would be useful for this application.

Colorants such as carbon black in the amount of about 1 wt. %, and defoamers to a level of about 0.05 wt. %, such as NXZ or DEFO, are useful for this application.

Finally, a plasticizer can be used to obtain the desired softness in the coating. ADMEX 314 is desirable since it is a non-volatile polymeric plasticizer and will not cause environmental or health hazards, and levels of about 2-5 wt. % make a significant difference in the softness of the coating.

Many alternative types of resins may be used for surface layers 120, provided they plastically flow at paving temperature, pressure, or both. Primary examples are PVC, nylon, acrylic, HDPE, and certain polyethylenes and polypropylenes, and ethylene vinyl acetate (EVA) which give the desired rigidity, compatibility, and corrosion resistance. They may be applied using hot-melt, emulsion, solvent, therma-cure or radiation-cure systems. In some embodiments, tack film 100 includes a multilayer film. For example, the carrier layer 110 may be a multilayer film with a surface layer coating 120 applied thereon. In other embodiments, the entire tack film 100 is a co-extrusion, and the surface layers 120 are resin films that are co-extruded with the carrier layer 110. The material of surface layer 120 may be the same as the material of the carrier layer 110, may include the same majority constituent as carrier layer 110, or may have a different majority constituent than carrier layer 110.

When any of these alternative resin materials are used for surface layer 120, an anti-blocking agent (e.g., wax, synthetic polymer, light dusting of talcum powder) may be included in surface layers 120 to prevent the tack film 100 from sticking to itself when stored in a spiral roll form and pulling away from the grid 10 during subsequent unrolling. A slip agent may also be included in the surface layers 120 on one or both sides of the carrier layer 110.

The above compositions are significantly compatible with asphaltic surface 140 and binder 135 courses. They permit strong bonding to the embedded tack film 100 in asphaltic concrete. The sturdy adhesion between layers of paving effectively decreases stress distribution to the surface layer by traffic. Such a solution can prevent slippage, cracking and de-lamination, known as premature stresses, caused or aided by lack of interface bonding.

A coefficient of thermal expansion of surface layer 120 approximates that of an asphaltic mixture. The surface layer 120 possibly avoids undesirable disengagement at the interface of the film 100 due to discrete thermal behavior in composite asphaltic concrete. The enhanced interfacial condition bestows an extended service life on the overlaid surface asphaltic layer 140 against prominent road stresses.

An example is described above in which the carrier film 110 comprises a first material (e.g., a polymer, such as polyethylene), and the film 110 is coated with a second material 120 (e.g., Vycar® 460×63 with additives, as described above). However, other embodiments are contemplated, in which the film 110 consists essentially of (or consists of) the non-asphaltic, resinous material that is described above for use as the coating material 120 (e.g., Vycar® 460×63 with additives). In such embodiments, the separate layer of coating material 120 may be omitted. Thus, the tack film layer may be a composite film 100 or a homogeneous resinous film. The choice of whether to use a composite or homogeneous film, and the choice of material for the carrier film 110, may depend on material cost, ease of manufacture, and commercial availability of each material, as can readily be evaluated by one of ordinary skill at any given time.

When impregnated and coated with a resinous coating or coextruded with a resinous film 120, the film 100 is, preferably, semi-rigid, and can be rolled-up on a core for easy transport as a prefabricated, continuous component to the place of installation, where it may be readily rolled out continuously for rapid, economical, and simple incorporation into the roadway. For example, film 100 can be placed on rolls 15 feet (4.5 meters) wide containing a single piece 100 meters long or longer. Alternatively, the binder course 135 may be covered by several narrower strips of film 100, typically, each about five feet (1.5 meters) wide. It is, therefore, practical to use this film 100 on all or substantially all of the surface of binder course 135, which is cost effective because of reduced labor.

At the paving site, the film 100 is unrolled with the adhesive 122 facing downwards and laid on the underlying paving 135 which is preferably about 40-140° F. (4.4-60° C.) upon application of the film 100.

The tack film 100 is rolled out and adhered to the underlayment layer, or asphaltic binder course 135, which is preferably about 0.75 inches (19 mm) or more in thickness. In some embodiments, before any overlay or asphaltic surface course 140 is placed on top of the film 100, the film 100 can be made sufficiently stable, such as by an adhesive 122 (e.g., pressure-sensitive adhesive) applied during manufacture of film 100, so that the film 100 resists the action of workmen walking on it, construction vehicles traveling over it, and, particularly, the movement of the paving machine over it.

The film 100, though semi-rigid, tends to lie flat. It has little or no tendency to roll back up after having been unrolled. This is believed to be due to the proper selection of binder and/or surface layer resin.

In some embodiments, as shown in FIGS. 1-2, the resurfaced pavement includes the pavement 130 to be resurfaced, the base layer 135, tack composite film 100, and surface layer 140, without a separate reinforcing layer.

In other embodiments, the tack film 100 is applied over the binder layer 135, a separate reinforcing layer is applied over the tack film 100, and the surface layer 140 is applied over the reinforcing layer. For example, the reinforcing layer may be a commercially available GlasGrid® product (e.g., 8550, 8501, 8502, 8511 or 8512 grid) from Saint Gobain Technical Fabrics.

In other embodiments, shown in FIGS. 3-6, the tack film 100 is included in a unitary composite reinforcing interlayer 200, 300, or 400. The unitary composite material 200, 300 or 400 includes a tack film layer 100 and a reinforcing layer 10.

Figure 3:
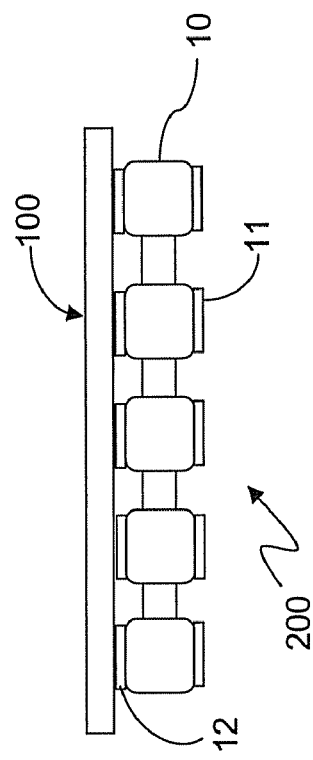
FIG. 3 is a cross sectional view of a first tack film—reinforcement composite material including the tack film of FIG. 2.
Figure 4:
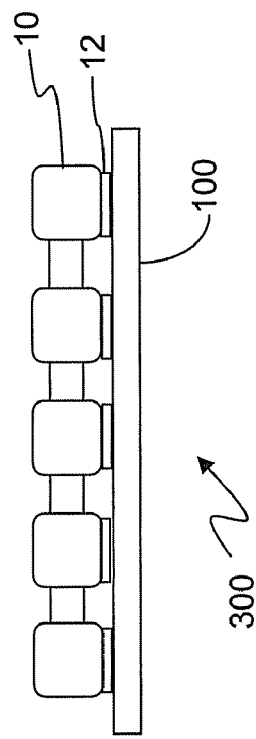
FIG. 4 is a cross sectional view of a variation of the tack film—reinforcement composite material shown in FIG. 3.
Figure 5:
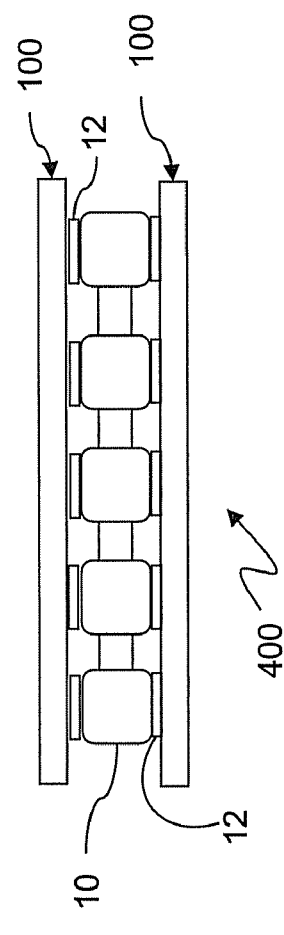
FIG. 5 is a cross sectional view of another variation of the tack film reinforcement composite material shown in FIG. 3.

In some embodiments, the composite reinforcing interlayer is a composite 200 (FIG. 3) comprising a composite or resinous tack film layer 100 above a reinforcing layer 10. The tack film layer 100 is bonded to the reinforcing layer 10 with adhesive 12, which may be a hot melt adhesive. The hot melt adhesive may be pressure sensitive or permanent. The bottom surface of the reinforcing material 10 (facing away from the tack film layer 100) has an adhesive 11, such as a pressure sensitive adhesive, which keeps the composite material 200 in place while the surfacing course is being applied. In the configuration of FIG. 3, the hot melt adhesive layer 12 bonds the tack film layer 100 to the underlying reinforcing layer 10, so the tack film layer 100 does not require its own adhesive layer 122. Also, the surface course 140 contacts the top of the film layer 100, and does not need an adhesive layer 122 on the upper surface of the film 100. Adhesive layer 122 may be omitted from the tack film 100 to be used in the composite material 200 of FIG. 3.

In some embodiments, the composite reinforcing interlayer is a composite 300 (FIG. 4) comprising a reinforcing layer 10 above a composite or resinous tack film layer 100. The tack film layer 100 is bonded to the reinforcing layer 10 with adhesive 12, which may be a hot melt adhesive. To ensure that the composite material 300 remains in place while the surface course 140 is being applied, the tack film 100 in composite material 300 includes the adhesive 122 on its bottom surface (which contacts the leveling course 135), as shown in FIG. 2.

In some embodiments, the composite reinforcing interlayer is a composite 400 (FIG. 5) comprising a reinforcing layer 10 sandwiched between a pair of composite or resinous tack film layers 100. It will be understood that in each of the descriptions below, the tack film 100 may be either a composite having a carrier layer 110 and a surface layer 120, or a homogenous film of a material suitable for use in the coating of the surface layer 120, wherein the homogenous film does not have a distinct carrier layer 110 therein. In composite 400, the tack film layers 100 are bonded to the reinforcing layer 10 with adhesive 12, which may be a hot melt adhesive. To ensure that the composite material 400 remains in place while the surface course 140 is being applied, the bottom tack film 100 (which contacts the leveling course 135) in composite material 400 includes the adhesive 122 on its bottom surface, as shown in FIG. 2. The top tack film layer 100 (which contacts the surface course 140) does not require the adhesive 122 on surface thereof. The adhesive 122 may be omitted from the top tack film layer 100.

Figure 7:
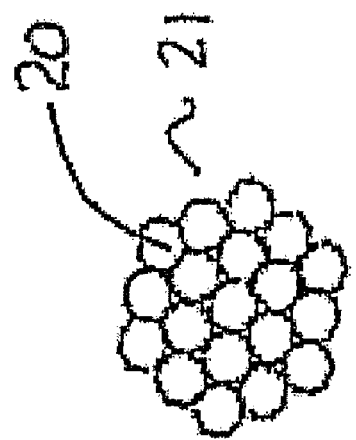
FIG. 7 is a cross sectional view of a strand of reinforcing material used in one embodiment of the tack film—reinforcement composite materials of FIGS. 3-5.

The reinforcing layer 10 may be any of a variety of reinforcing materials. In some embodiments, an open grid (shown in FIGS. 9 and 10) comprising at least two sets of substantially parallel strands 21 (shown in cross section in FIGS. 7 and 8) is provided as the reinforcing layer 10. Each set of strands 21 includes openings 19 (FIG. 9) between adjacent strands 21, and the sets are oriented at a substantial angle to one another (e.g., optionally approximately 90 degrees). In some embodiments, the reinforcing layer may be a GlasGrid® product (e.g., 8550, 8501, 8502, 8511 or 8512 grid) from Saint Gobain Technical Fabrics.

Figure 9:
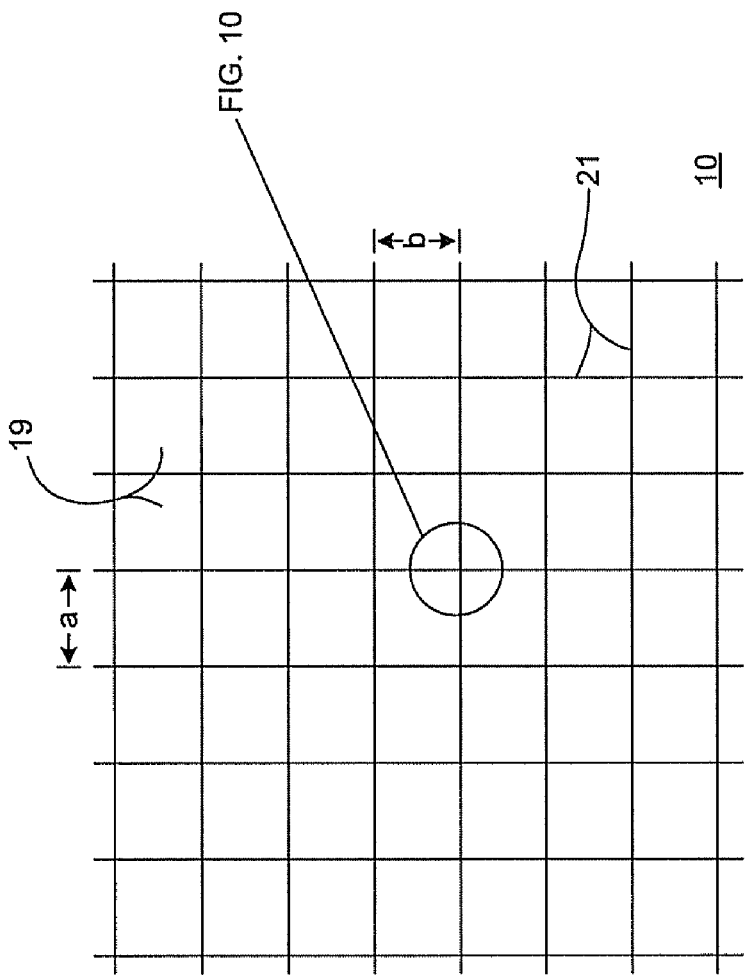
FIG. 9 is a plan view of a reinforcing grid comprising the strands of FIG. 8.

In some embodiments, the grid 10 preferably comprises a weft-inserted warp knit in which the strands 21 are oriented at about a 90° angle to one another, as shown in FIG. 9. The openings preferably have a dimension of about 0.5 inch×0.5 inch (12 mm×12 mm) or larger, although the openings may be as large as approximately 1 inch×1 inch. Although the openings 19 can be square, the dimensions "a" and "b" may be dissimilar, such as in the case of a rectangle.

Figure 8:
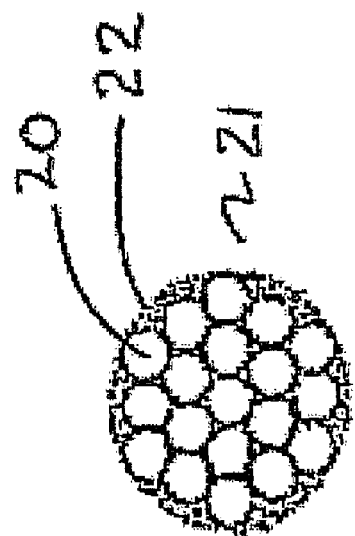
FIG. 8 is a cross-sectional view of the strand of FIG. 7 after impregnation of the strand with resin.

In some embodiments, a non-asphaltic coating 22 is disposed over the grid 10 without closing the openings between the strands 21, as best seen in FIG. 8. The coating 22 is activated at a paving temperature, pressure, or both, to form a bond compatible with asphaltic paving. The coating 22 is not tacky at ambient temperature and pressure so that it can be handled easily at a job site. In some embodiments, the coating 22 on the strands 21 is the same material as the coating 120 that is applied to the polymeric film 110 in the composite tack film 100.

The large grid openings 19 shown in FIG. 9 permit the asphalt mixture 135 and/or 140 to encapsulate each strand 21 of yarn 20 or roving completely, and permit complete and substantial contact between the tack layer 100 and both the binder and surface courses 135 and 140. The tack layer 100 substantially bonds layers 135 and 140 through the openings 19 of the grid 10 to permit substantial transfer of stresses from the pavement 135, 140 to the glass or similar fibers of reinforcing layer 10. The resulting composite grid material has a high modulus and a high strength to cost ratio, its coefficient of expansion approximates that of road construction materials, and it resists corrosion by materials used in road construction and found in the road environment, such as road salt.

The grid 10 may be formed of strands or yarns 21 of continuous filament glass fibers, though other high modulus fibers, such as polyamide fibers of poly(p-phenylene terephthalamide), known as Kevlar®, may be used. ECR or E glass rovings of 2000 tex and preferred, though one could use weights ranging from about 300 to about 5000 tex. The preferred fiberglass yarns have a strand strength of about 560 lb/in. (100 kN/m) or more when measured in accordance with ASTM D6637, with an elongation at break of 5% or less. These strands preferably have a mass/unit area of less than about 22 oz/yd$^2$ (740 g/m$^2$), and more preferably about 11 oz/yd$^2$ (370 g/m$^2$).

These strands, which are preferably low twist (i.e., about one turn per inch or less), are formed into grids with rectangular or square openings 19, preferably ranging in size from ¾ inch to 1 inch on a side (dimensions "a", "b", or both in FIG. 9), though grid openings 19 ranging from ⅛ inch to 6 inches on a side ("a", "b", or both) may be used.

Figure 10:
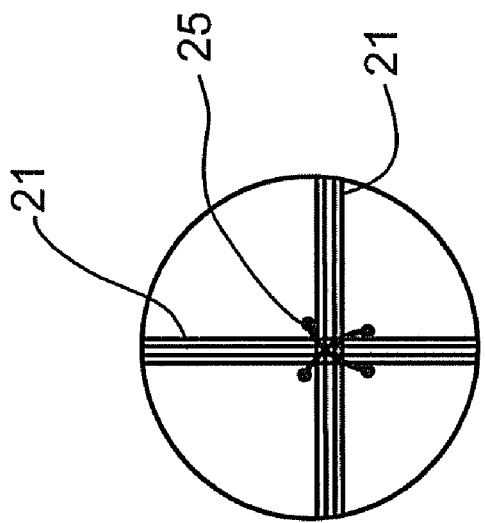
FIG. 10 is an enlarged detail of an intersection in the grid shown in FIG. 9.

The grids 10 are preferably stitched with thread 25, shown in FIG. 10, or otherwise fixedly connected at the intersections of the crosswise and lengthwise strands. This connection holds the grid 10 in its grid pattern, prevents the strands 21 from spreading out unduly before and during impregnation by the non-asphaltic coating 22, and preserves the openings 19, which permit the overlayment to bind to the underlying layer and thereby increase the strength of the final composite roadway repair 100.

The fixed connections at the intersections of the grid 10 also contribute to the strength of the grid 10 because they permit forces parallel to one set of strands 21 to be transferred in part to the other set of parallel strands 21. At the same time, this open grid construction makes possible the use of less glass per square yard and is, therefore, a more economical product than a closed woven fabric, for example. We prefer to use a grid 10 of about 8 ounces per square yard, though 4 to 24 ounces per square yard may be used.

While we prefer stitching grid intersections together on warp-knit, weft-insertion knitting equipment using 70 to 150 denier polyester thread 25, or equivalent, other methods of forming grids with fixedly-connected intersections may be utilized. For example, a non-woven grid made with thermosetting or thermoplastic adhesive may provide suitable strength.

Once the grid 10 is formed, and before it is joined to the tack film 100, a resin, preferably a thermoplastic resin 22, is applied. That is to say, the grid 10 is "pre-impregnated" with resin 22.

The viscosity of the resinous coating 22 is selected so that it penetrates into the strands 21 of the grid 10. While the resinous coating 22 may not surround every filament 20 in a glass fiber strand 21, the resinous coating 22 is generally uniformly spread across the interior of the strand 21, as shown in FIG. 8. This impregnation imparts a preferable semi-rigid nature to the strand 21, and cushions and protects the strands 21 and glass filaments 20 from corrosion by water, salt, oil and other elements in the roadway environment. The impregnation also reduces abrasion between glass strands 21 or filaments 20 and the cutting of one glass strand 21 or filament 20 by another. The impregnation also reduces the tendency of the glass fibers to cut each other after the grid has been laid down, but before the overlayment 140 has been applied.

The grid should preferably have a minimum strength of about 25 kN per meter (kN/m) in the direction of each set of parallel strands, more preferably about 50 kN/m, and most preferably, about 100 kN/m or more, with preferably less than about 10%, and more preferably less than 5% elongation at break.

While drying or curing the preferred resinous coating 22 on the grid 10, the strands 21 may be somewhat flattened, but the openings 19 are maintained. For example, in a preferred embodiment using 2000 tex rovings, a rectangular grid 10 may be formed with openings 19 of about ¾ inch by one inch (a=b=0.75 in.), and the rovings flattened to about 1/16 inch (1.6 mm) to ⅛ inch (3.2 mm) across. The thickness of the rovings after coating and drying can be about 1/32 inch (0.8 mm) or less. A preferred grid of glass fiber strands is uncoated GlasGrid® product (e.g., 8550, 8501, 8502, 8511 or 8512 grid) available from Saint-Gobain Technical Fabrics.

Many resins can be used for impregnating the grid 10 provided they plastically flow at paving temperature, pressure, or both. Primary examples are PVC, nylon, acrylic, HDPE, and certain polyethylenes and polypropylenes, which give the desired rigidity, compatibility, and corrosion resistance. They may be applied using hot-melt, emulsion, solvent, therma-cure or radiation-cure systems, for example, a coating containing a PVC emulsion such as Vycar® 460×63. The PVC emulsion could also include about 1-8 wt. % wax release agent, and about 0-10 wt. % of one or more other additives selected from the group consisting of soluble polymer, ammonia, thickener, carbon black, defoamer, and plasticizer. Any material suitable for use as the coating 120 (such as any of the materials described above) of composite polymer film 100 may be used as the coating 22 for the grid 10. In some embodiments, coatings 120 and 22 are the same material. In other embodiments, coatings 120 and 22 are different materials, wherein each coating 120, 22 is compatible with asphalt and activatable by heat and/or pressure.

The coatings 120 and 22 are activatable by pressure, heat, or other means. A pressure activatable resin forms a bond when a surface coated with it is brought into contact with a second untreated surface, and pressure is applied. A heat activatable resin forms a bond when a surface coated with it is brought into contact with an untreated surface and heat is applied. As compared with other adhesives which are tacky at ambient temperatures (e.g., about 72° F.) and pressures (e.g., about 1 atmosphere), the coatings 120 and 22 are preferably not tacky at ambient temperature or pressure, and only become so at approximately paving pressure or temperature.

In most uses, the coatings 120 and 22 do not plastically flow or adhere until a coating temperature of about 120-140° F. (49-60° C.) is reached, or a paving course of about 1-1.5 inches (25-38 mm) or more in thickness is applied, or both. The melting point of the E-glass fiber is about 1800-1832° F. (about 1000° C.), which ensures stability when subjected to the excessive heat of a paving operation.

It is desirable that the shear strength between the surface course 140 and binder course 135 be as high as possible, and that the shear strength be substantial over the extremely broad range of temperatures to which the grid 10 will be subjected. The tack film—grid composite 200, 300 or 400 may be installed on paving underlayments at ambient temperatures as low as about 40° F., and asphaltic concretes may be applied at temperatures of about 250-320° F. (121-160° C.), generally about 300° F. (149° C.), raising the coating 22 temperature to about 150° F. (66° C.). We therefore prefer that coatings 120 and 22 have a melting point or glass transition temperature, Tg, of about 66-77° F. (20-25° C.) or higher, and that they preferably plastically flow above about 120-140° F. (50-60° C.) under typical pressures exerted by paving.

Once temperatures of about 265-300° F. (130-150° C.) are achieved, flow is possible even at very low pressures, such as when very thin asphaltic layers are applied. This would enable plastic flow of the coatings 120 and 22 to improve shear strength between the surface and binder courses 140 and 135 in and around the grid 10.

The viscosity of the coatings 120 and 22 should be sufficiently fluid to flow onto the grid, but preferably is sufficiently viscous that it does not flow out of or through the grid during application or storage, but rather stays on the grid.

EXAMPLE 1

The coating 22 described in Table 1, below, was prepared and applied to an uncoated GlasGrid® product (8501 or 8511 grid) from Saint Gobain Technical Fabrics:

The preferred resin systems useful for the coatings 120 and 22 include those that are liquid, or can be liquified, for impregnating some or all of the spaces between the filaments 20. The resin system should be activated at paving temperature, pressure, or both, to form a bond compatible with asphaltic paving. Such systems may include thermosetting resins, such as B-stage epoxy, silicone, or phenolic; or thermoplastics, such as nylon, polyethylene, polypropylene, polyurethane or polyvinyl chloride. Plastisols including resin and solvent mixtures or neat resin, with or without additives, are useful alternatives. Preferred ingredients and ranges for a desirable polyvinyl-chloride latex emulsion system are provided in Table 1, below:

TABLE 1

Preferred PVC Coating Ranges

| Generic Description | Commercial Name | Broad range dry wt. % | Narrow range dry wt. % |
|---|---|---|---|
| base PVC-acrylic latex | Vycar 460x63 | 40-60 | 45-50 |
| internally plasticized PVC latex | Vycar 578 | 0-20 | 7-14 |
| styrene-acrylic latex | Rhoplex AC-1035 | 5-25 | 15-20 |
| ethylene-acrylic acid latex | Michemprime 4983-40R | 5-25 | 12-18 |
| organic oils/silica defoamer | DeeFo 97-3 | 0-1 | 0.1-0.3 |
| carbon black dispersion | Helzarin black | 0-5 | 0.5-2 |
| EBS anti-blocking wax dispersion | Hydrocer 145 | 0-5 | 1-3 |
| acrylic solution polymer | Carboset 514 | 0-10 | 1.5-3.5 |
| non-ionic surfactant | Sryfynol 104 PA | 0-1 | 0.05-0.15 |
| non-ionic surfactant | Sryfynol 104 PG 50 | 0-1 | 0.05-0.15 |
| fluorosurfactant | Zonyl FSO | 0-1 | 0.05-0.15 |

TABLE 1-continued

Preferred PVC Coating Ranges

| Generic Description | Commercial Name | Broad range dry wt. % | Narrow range dry wt. % |
|---|---|---|---|
| saturated aqueous ammonia | 28% ammonia | 0-1 WET % | 0-0.1 WET % |
| poly acrylic acid thickener | ASE-6038A | 0-5 | 0.25-1/0 |

DeeFo 97-3 can be replaced by Foam Blast or Dow Corning 1430 silicone defoamers
Helzarin black can be replaced by Octojet black 104
ASE-6038A can be replaced by ASE-60

When impregnated and coated with a resinous, non-asphaltic coating 22 (FIG. 8), the tack film—grid composite 200, 300 or 400 (FIGS. 3-5) is preferably semi-rigid, and can be rolled-up on a core for easy transport as a prefabricated, continuous component to the place of installation, where it may be readily rolled out continuously for rapid, economical, and simple incorporation into the roadway. For example, it can be placed on rolls 5 feet (1.5 meters) wide containing a single piece 100 yards or longer. The installation procedure for the tack film—grid composite 200, 300 or 400 may be the same as described above with reference to the separate tack film 100. It is, therefore, practical to use this tack film—grid composite 200, 300 or 400 on all or substantially all of pavement surface. It can also be used to reinforce localized cracks 231 (FIG. 6), such as expansion joints.

The grids 10, though semi-rigid, tend to lie flat. They have little or no tendency to roll back up after having been unrolled. This is believed to be due to the proper selection of binder and/or coating resin and the use of multifilament reinforcing strands, preferably of glass, in the grid 10.

The large grid openings 19 shown in FIG. 9 permit the asphalt mixture to encapsulate each strand 20 of yarn 21 or roving completely, and permit complete and substantial contact between the composite 200, 300, 400 and the binder and surface courses 135 and 140. The surface course 140 preferably is disposed in a thickness of about 1.5 inches (40 mm) or more. The resulting composite 200, 300, 400 has a high modulus and a high strength to cost ratio, its coefficient of expansion approximates that of road construction materials, and it resists corrosion by materials used in road construction and found in the road environment, such as road salt.

From the foregoing, it can be realized that the self adhesive tack film may be used in a reinforcement for asphaltic paving, either alone, or in combination with an open grid and a resinous, coating which is activated at paving temperature, pressure, or both, to form a bond compatible with asphaltic paving.

EXAMPLE 2

Polymer Resin Coated Film Preparation

A thin polyethylene (PE) and polypropylene (PP) blended film of 12.7 micrometers in thickness was prepared. The film was perforated with openings of 0.5 millimeter diameter every 25.4 millimeters at interval to ease heat transfer from the hot mix asphalt mixtures of the surface layer application to the lower asphalt layer, and to let the film adhere to the asphalt pavement layers. The film was dipped into a bulk polymerized (vinyl chloride) PVC acrylic copolymer in emulsion at 21° C. and the coated film was dried for 2 minutes in the convection oven at 100° C. until a residual rate of 123 gram per meter2 of coating on the film was achieved.

The film is preferably a synthetic material to carry the polymeric resin with strong adhesion to the asphaltic system. Illustrative of, but not limiting, the thin films which can be used are the following:

Polyethylene
Polypropylene
Polyethylene and polypropylene copolymer
Polyester
Polyvinyl chloride
Fibreglass mat
Thermoplastic polyolefin
Ethylene vinyl acetate Some of the preferred polymers which may be used in preparing the non-asphaltic resins include acrylic copolymer, i.e., acrylic copolymer and polyvinylchloride acrylic copolymer.

Table 2 provides mechanical testing data for various films of different substrate materials, on which a PVC acrylic copolymer coating was applied at a rate of 123 gram per meter2. The tested substrate materials included a blended film of PE and PP (Sample 1); a film of polyester (Sample 2); a film of thermoplastic polyolefin (Sample 3) and a mat of fiberglass (Sample 4).

TABLE 2

Mechanical Testing Data

| Samples | Substrate Materials (thickness in micrometer) | Tensile at Break* ($N/mm^2$) | Shear at Break** ($N/mm^2$) |
|---|---|---|---|
| 1 | PE (80%)/PP (20%) (12.7) | 1.91 | 1.24 |
| 2 | Polyester (12.2) | 9.44 | 1.03 |
| 3 | Polyolefin (25.4) | 5.14 | 1.54 |
| 4 | Fibreglass mat (254) | 13.83 | 0.92 |

*Tensile testing followed ASTM D638-02a protocol at 60% humidity at 21° C.
**Mechanical bonding of films in paving system was determined by measuring shear strength on bituminous cylindrical specimens four inches (100 millimeters) in diameter, which were prepared by using Marshall apparatus according to ASTM D6926-04. Each film was placed in a specimen including two asphaltic layers and sheared at a constant displacement rate of 1 millimeter per minute.

A pressure sensitive adhesive 11 may be applied to the bottom of the grid 10 during fabrication of the grid 10 or composite product 200, to facilitate installation, where the grid 10 is the bottom layer of the composite 200 upon installation. The adhesive 11 may be of a different type from the hot melt adhesive 12 used to attach the pre-coated film 100 onto the grid 10. If present, the pressure sensitive adhesive 11 is activated by applying pressure to the surface of the polymer resin coated film 100 of composite 200. If a pressure sensitive adhesive 11 is used, substantial force may be required to unroll the film; a tractor or other mechanical means may be used. The adhesive 11 is preferably a synthetic material and may be applied to the pre-coated film in any suitable manner, such as by use of a latex system, a solvent system, or a hot melt system. In a preferred latex system, the adhesive 11 is dispersed in water, printed onto the film using a gravure print roll, and dried. In a solvent system, the adhesive is dissolved in an appropriate solvent, printed onto the film, and then the solvent is evaporated. In the hot melt system, the adhesive may be melted in a reservoir, applied to a roll, and metered on the roll with a closely controlled knife edge to create a uniform film of liquid adhesive on the roll. The grid 10 is then brought into contact with the roll and the adhesive transferred to the bottom of grid 10. These application methods are only exemplary, and other methods may readily be selected by those of ordinary skill in the art for applying the adhesive using a latex, solvent, or hot melt system.

EXAMPLE 3

Figure 11:
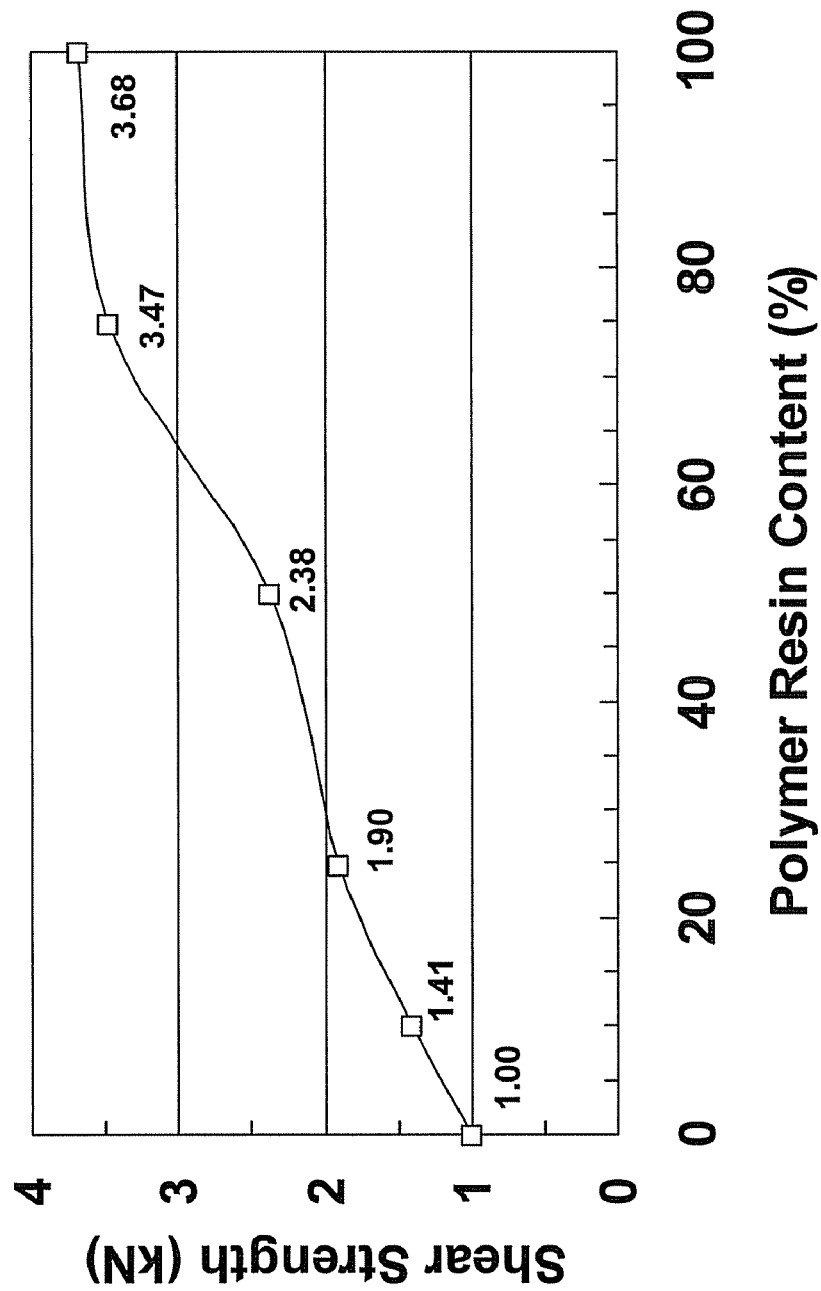
FIG. 11 shows shear performance of the material of FIG. 2.

FIG. 11 is a plot of data from a series of trials conducted on compositions for use in the coating 120 and/or coating 22. The data were used to determine what percentage of asphaltic emulsion could be blended with the non-asphaltic resinous material used in the coating 120 without substantially degrading the shear performance relative to the shear performance of a non-resinous coating.

Asphalt emulsion was blended with the polymer resin described in Table 1, with the relative amounts based upon percentage of dry weight. The blended resin was prepared using 6 different resin/asphalt ratios; polymer vs. asphalt (100% resin, 75:25, 50:50, 25:75, 10:90, 0:100).

A non-coated e-glass grid fabric, called "greige", was manually dipped into the resin or resin/asphalt mixture and thoroughly impregnated and dried out. The manually coated fabric was placed in between a pair of asphalt pucks (four-inch diameter cylindrical shaped samples). Each puck was constructed with asphalt mixes under 146° C. by 75-blow standard Marshall compactor according to ASTM D6926-04. Shear performance was conducted by means of direct shear testing method.

As shown in FIG. 11, the shear strength varied from 1 kN for a pure asphaltic coating to 3.68 kN for 100% non-asphaltic resin. From a curve fitting the data points, at about 30% resin, the shear strength is about twice that of the asphaltic emulsion alone. At about 50% resin, the shear strength is about 2.4 times that of the asphaltic emulsion. At about 75% resin, the shear strength is about 3.5 times that of the asphaltic emulsion. With about 80% resin, the shear strength of about 3.5 kN is nearly as high as the shear strength (about 3.7 kN) of the 100% polymer resin. Thus, mixtures of about 75% to about 80% resin provide nearly the full strength of the 100% resin coating, while providing greater economy.

Thus, if a blended coating is to be used, the material used for the surface layer 120 of the tack film 100 preferably includes 50% or more of the non-asphaltic polymer resin in the blend with the asphaltic emulsion.

Figure 14:
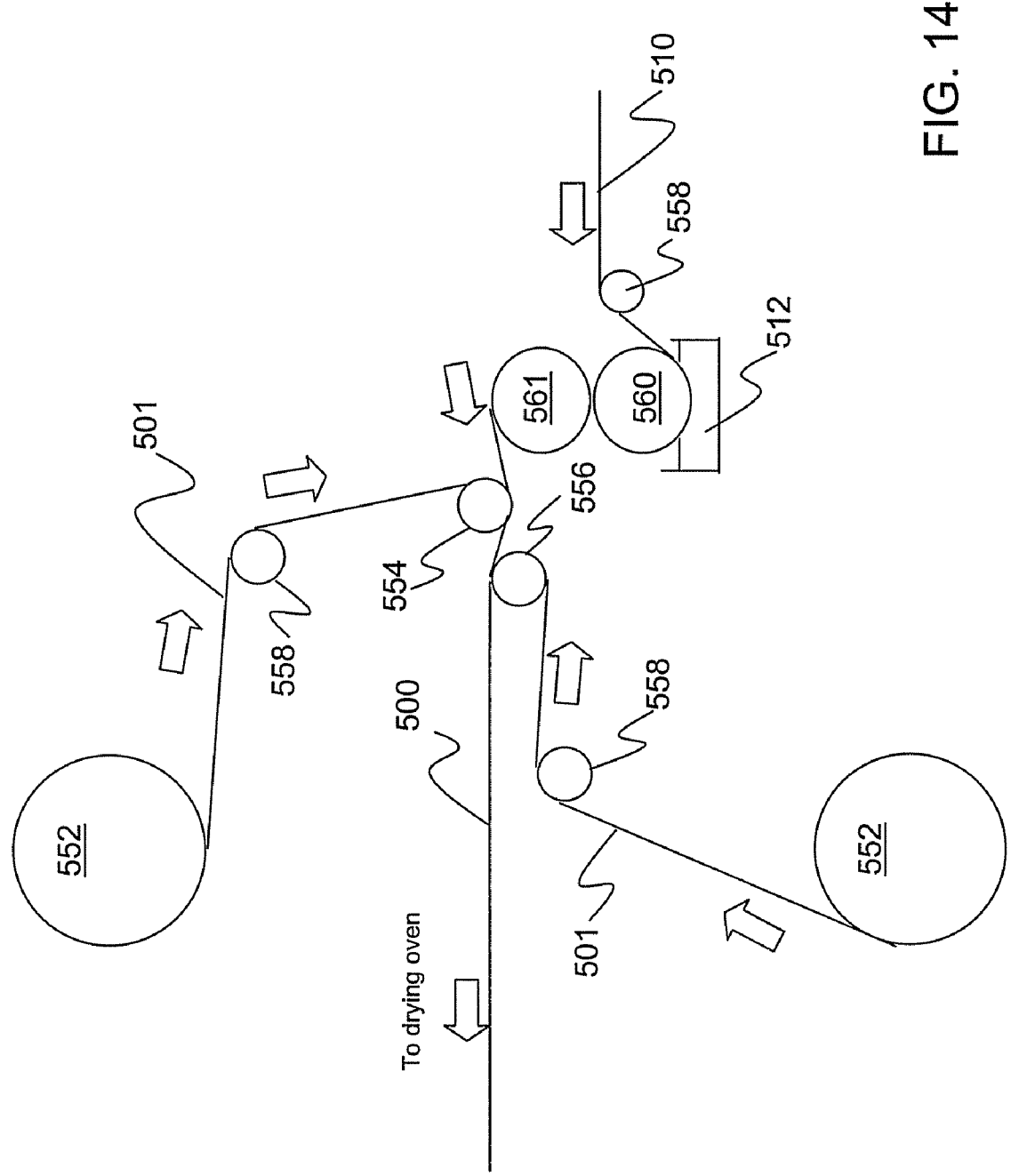
FIG. 14 is a diagram of an apparatus for making the product of FIG. 12.

FIGS. 12-14 show another embodiment. FIG. 12 shows a product 500 comprising first and second non-woven polymer substrates 501, a layer of reinforcing fibers 510 sandwiched between the non-woven polymer substrates 501, and an adhesive 512 joining the layer of reinforcing fibers to the non-woven substrates. The mesh or scrim 510 is bonded to the substrates 501 and made into rolls in any of a variety of widths and/or lengths.

In some embodiments, the substrates 501 may comprise polyester non-woven felt webs. The polyester non-woven substrates are each nominally 17.0 $g/m^2$ or 0.5 $oz/yd^2$ in weight. Thickness of each is 0.14 mm or 0.0056". These polyester non-wovens are commercially available from Shalag Shamir Non-wovens of Upper Galilee, Israel. In other embodiments, substrates 501 may be a polyethylene non-woven felt, although other materials, such as a polyethylene-polypropylene copolymer could be used. Other polymers that are compatible with asphalt may be used for the substrates 501 (e.g., PVC, nylon (polyamide), acrylics, HDPE, and certain polypropylenes, which give the desired rigidity, compatibility, and corrosion resistance.). In other embodiments, the substrates 501 may comprise a multi-layer sheet made of two or more of these materials, or one of these materials in combination with a different compatible material.

The layer of reinforcing fibers 510 includes fiber glass mesh or scrim including at least a first set of yarns oriented substantially in a machine direction. The yarns may comprise ECR or E-glass filaments. In other embodiments, other high modulus fibers, such as polyamide fibers of poly (p-phenylene terephthalamide), known as "KEVLAR®," may be used.

The adhesive 512 is capable of being activated at a paving temperature, pressure, or both, to form a bond compatible with asphaltic paving. Preferably, the adhesive 512 comprises 50-99 wt. % PVC latex emulsion. In some embodiments, the adhesive 512 is the PVC latex emulsion described above in Table 1.

Referring now to FIG. 12, in some embodiments, the product includes mesh or scrim 510 of reinforcing fiber coated yarns (e.g., fiber glass) and two polyester nonwoven substrates 501. The fiber glass mesh or scrim 510 is formed by "turbine technology." Turbine technology involves the use of a rotating turbine head equipped with cross direction yarns and utilizing a machined spiral mechanism to control the cross direction spacing of the yarns. The fiber glass scrim 510 is then impregnated and coated with a binder. Many resins can be used for the binder, provided they plastically flow at paving temperature, pressure, or both. In some embodiments, the binder is the PVC latex emulsion described above in Table 1. In other embodiments, the binder may be acrylic, PVC, nylon, HDPE, and certain polyethylenes and polypropylenes, which give the desired rigidity, compatibility, and corrosion resistance. The binder may be applied using hot-melt, emulsion, solvent, therma-cure or radiation-cure systems. Immediately after coating the yarns with the binder, the scrim 510 is laminated to the two polyester substrates 501 using adhesive 512.

In some embodiments, the adhesive 512 and the binder are both the same PVC latex emulsion described above in Table 1, and a single application step is used to impregnate the yarns with the binder/adhesive and coat the yarns with adhesive 512 for the lamination steps. In other embodiments, the adhesive 512 may be applied separately from the step of impregnating the yarns 510 with binder. For example, a separate adhesive applying step would be used if the binder and adhesive 512 are different materials from each other.

After the mesh or scrim 510 are coated, the product 500 is then cured (e.g., in the drying section of the machine) and wound into finished rolls. The result is a tri-laminated product 500 with fiber glass scrim 510 sandwiched between a top layer 501 and a bottom layer 501 of polyester non-woven substrate.

FIG. 14 shows one example of an apparatus for making the product of FIG. 12. The top and bottom substrates 501, which may be a polyester non-woven material, are fed from rolls 552. The direction of the substrates 501 may be controlled by feed rollers 558. The fiber glass scrim 510 is fed by way of another roller 558 and passes through a vessel containing the coating 512, which coats the scrim 510. The coated scrim 510 emerges from the coating vessel and is redirected by one or more rollers 560, 561. The top non-woven layer 501 and the coated scrim 510 then pass under a first laminating roll 554, while tension is maintained between a second laminating roll 556 and the roller 561, to join the scrim to the top non-woven layer 501. The top non-woven layer 501, with scrim 510 laminated thereto, is then fed past another laminating roller 556, which joins the bottom non-woven substrate 501 to the bottom of the scrim 510 to form the product 500. The laminated product 500 then is fed to the drying oven (not shown).

In other embodiments (e.g., FIG. 13), the fiber glass scrim includes a first set of yarns 510m extending in the machine direction and a second set of yarns 510c oriented substantially in a cross direction. In some embodiments, the scrim 510c, 510m includes three yarns per inch (about one yarn per centimeter) in both the machine and cross directions. A product having three yarns per inch is suitable for use in pavements in low traffic areas. A larger count of yarns per inch may be used to provide greater reinforcement, for areas of moderate traffic.

The product 600 (FIG. 13) may be made using the same machine as product 500 (FIG. 12), with a few modifications to the process. The cross direction yarns 510c are laid on top of the machine direction fibers 510m, and are substantially perpendicular to the machine direction. The top layer 501t of polyester is fed from the top, but is run with the scrim 510m, 510c through the coating pan and coating rolls (not shown). This is done to maintain the yarn spacing in the finished product 600 (with scrim 510c between the top layer 501t and the scrim 510m). The bottom layer 50b of polyester is applied in the same manner as described above, immediately after the binder/adhesive 512 is applied to the scrim, just as it leaves the coating rolls.

FIG. 15 shows a pavement configuration 550 using the product 500 (FIG. 12) or 600 (FIG. 13). During the maintenance and repair of pavement 550, an asphaltic binder course 235 is overlaid on top of an existing old pavement 230, which has a crack 231. The old pavement 230 is typically texturized, or milled down, by an abrasive roll (not shown), which provides a good gripping surface for the binder course 235. (Alternatively, the products 500 and 600 may be laid over new asphalt/portland cement concrete pavement surface).

A bitumen tack coat is applied, for example as a hot spray or emulsion. The application rate may be from about 0.1 gallons/yard$^2$ to about 0.3 gallons/yard$^2$. After the bitumen is sprayed, the product 500 or 600 is rolled into the bitumen by either mechanical or manual means. The bitumen forms a bond between the product 500, 600 and the binder course 235, and is also absorbed into the product 500 or 600 to form a waterproofing membrane. Then the asphalt concrete overlay 240 is applied in one of a variety of thicknesses.

Although the invention has been described in terms of exemplary embodiments, it is not limited thereto. Rather, the invention should be construed broadly, to include other variants and embodiments, which may be made by those skilled in the art without departing from the scope and range of equivalents of the invention.

What is claimed is:

1. A reinforcement for asphaltic paving comprising:
   an open grid comprising at least two sets of substantially parallel strands, each set of strands having openings between adjacent strands and the sets being oriented at a substantial angle to one another; and
   a coating thoroughly impregnating the strands and disposed over said grid to surround the strands without closing the openings between the strands, said coating being activated at a paving temperature, pressure, or both, to form a bond compatible with asphaltic paving, said coating not being tacky at an ambient temperature and pressure, said coating comprising a resinous non-asphaltic material, wherein the same resinous non-asphaltic material impregnates and coats the strands, and the coating comprises:
   40-60 wt % pvc-acrylic latex;
   5-25 wt % styrene-acrylic acid latex;
   5-25 wt % ethylene-acrylic acid latex; and
   0-20 wt % internally plasticized pvc latex;
   0-1 wt % organic oil/silica defoamer;
   0-5 wt % carbon black dispersion;

0-5 wt % EBS anti-blocking wax dispersion;
0-10 wt % acrylic solution polymer;
0-2 wt % non-ionic surfactant;
0-1 wt % fluorosurfactant; and
0-5 wt % polyacrylic acid thickener.

2. The reinforcement of claim 1, wherein said resinous non-asphaltic coating comprises a thermoplastic resin.

3. The reinforcement of claim 1, wherein said sets of strands are oriented at a 90° angle to one another, and said openings have a dimension of at least about 0.5×0.5 inches (12.5 mm×12.5 mm).

4. The reinforcement of claim 1, wherein said paving temperature is within a range of about 250-320° F., and said ambient temperature is about 68-72° F., and said coating is heated to at least about 150° F. by said paving.

5. The reinforcement of claim 1, wherein said resinous non-asphaltic coating comprises 50-99 wt. % PVC latex emulsion, 1-8 wt. % wax release agent, and about 0-10 wt. % of one or more other additives selected from the group consisting of: soluble polymer, ammonia, thickener, carbon black, defoamer, and plasticizer.

6. The reinforcement of claim 1, wherein the coating comprises:
45-50 wt % pvc-acrylic latex;
7-14 wt % internally plasticized pvc latex;
15-20 wt % styrene-acrylic acid latex;
12-18 wt % ethylene-acrylic acid latex;
0.1-0.3 wt % organic oil/silica defoamer;
0.5-2 wt % carbon black dispersion;
1-3 wt % EBS anti-blocking wax dispersion;
1.5-3.5 wt % acrylic solution polymer;
0.05-0.15 wt % non-ionic surfactant;
0.05-0.15 wt % fluorosurfactant; and
0.25-1.0 wt % polyacrylic acid thickener.

7. A method of reducing reflective cracking in paving comprising:
(a) applying an asphaltic binder course having a thickness of at least about 0.75 inches (19 mm) to an existing road surface;
(b) applying the reinforcement of claim 1 to said asphaltic binder course; and
(c) applying an asphaltic surface course having a thickness of at least about 1.5 inches (40 mm) over said grid, asphaltic binder course and said existing road surface, whereby said thermoplastic resin, plastically flows to improve the interlaminar bond between said asphaltic binder course and said asphaltic surface course, such that the shear strength in a four inch puck, including said grid, said asphaltic binder course, and said asphaltic surface course is at least about 1 kN.

8. The reinforcement of claim 1, wherein said strands comprise E-glass filaments.

9. The reinforcement of claim 1, wherein said open grid is provided in a roll having a width of about 3-6 feet (0.9-1.8 m).

10. A method of reinforcing paving in which a second layer of paving is placed on top of a first layer of paving, comprising:
(a) providing an open grid comprising at least two sets of substantially parallel strands, each set of strands having openings between adjacent strands, and the sets being oriented at a substantial angle to one another; a coating thoroughly impregnating the strands and disposed over said grid to surround the strands without closing the openings between the strands, said coating being activated at a paving temperature, pressure, or both, to exhibit plastic flow and form a bond compatible with asphaltic paving, said coating not being tacky at an ambient temperature and pressure, said coating comprising a resinous non-asphaltic material, wherein the same resinous non-asphaltic material impregnates and coats the strands, and the coating comprises:
40-60 wt % pvc-acrylic latex;
5-25 wt % styrene-acrylic acid latex;
5-25 wt % ethylene-acrylic acid latex; and
0-20 wt % internally plasticized pvc latex;
0-1 wt % organic oil/silica defoamer;
0-5 wt % carbon black dispersion;
0-5 wt % EBS anti-blocking wax dispersion;
0-10 wt % acrylic solution polymer;
0-2 wt % non-ionic surfactant;
0-1 wt % fluorosurfactant; and
0-5 wt % polyacrylic acid thickener;
(b) continuously unrolling the grid, over the first layer of paving, while maintaining the respective strands of the grid in substantially parallel alignment; and
(c) activating the coating by applying the second layer of paving on top of the first layer of paving, the second paving layer passing through openings in the grid, so that the grid openings provide for significant and substantial direct contact between the first and second paving layers, said activation causing said coating to plastically flow to improve the interlaminar bond between said first and second layers of paving.

11. The method of claim 10, wherein said coating comprises a dried PVC emulsion.

12. The method of claim 10, wherein said first layer of paving comprises an asphaltic binder course and said second layer of paving comprises an asphaltic surface course.

13. The method of claim 10, wherein said asphaltic surface course is applied at a temperature of at least about 250-320° F., and said coating is heated to at least about 120-140° F.

14. The method of claim 10, wherein said asphaltic surface course is disposed in a thickness of at least about 1.50 inches (40 mm).

15. The method of claim 10, wherein said resinous non-asphaltic coating comprises about 50-99 wt. % PVC latex, 1-8 wt. % wax release agent, and about 0-10 wt. % of one or more additives selected from the group consisting of: soluble polymer, ammonia, thickener, carbon black, defoamer, and plasticizer.

16. The method of claim 10, wherein said interlaminar bond between said first and second layers of paving is greater than about 1.0 kN in shear testing conducted with four inch diameter pucks.

17. The method of claim 10, wherein said interlaminar bond between said first and second layers of paving provides shear strength of at least about 2.0 kN when carried out in four inch diameter pucks.

18. The method of claim 10, wherein said first layer of paving is disposed on an existing road surface.

19. The method of claim 10, wherein said existing road surface comprises concrete, asphalt, or both.

20. The method of claim 10, wherein the coating comprises:
45-50 wt % pvc-acrylic latex;
7-14 wt % internally plasticized pvc latex;
15-20 wt % styrene-acrylic acid latex;
12-18 wt % ethylene-acrylic acid latex;
0.1-0.3 wt % organic oil/silica defoamer;
0.5-2 wt % carbon black dispersion;
1-3 wt % EBS anti-blocking wax dispersion;
1.5-3.5 wt % acrylic solution polymer;
0.05-0.15 wt % non-ionic surfactant;
0.05-0.15 wt % fluorosurfactant; and
0.25-1.0 wt % polyacrylic acid thickener.

21. A process for making a reinforcement for asphaltic paving comprising:
(a) providing an open grid comprising at least two sets of parallel strands of continuous filament fibers, said grid having openings between adjacent strands and the two sets of strands being substantially perpendicular to each other;
(b) impregnating the strands of the grid with a binder resin; and
(c) applying a non-asphaltic coating to the resin-impregnated grid surrounding the strands, said coating comprising a thermoplastic PVC latex resin which plastically flows at a paving temperature, pressure, or both, wherein the binder resin is the same non-asphaltic coating that surrounds the strands, and the coating comprises:
40-60 wt % pvc-acrylic latex;
5-25 wt % styrene-acrylic acid latex;
5-25 wt % ethylene-acrylic acid latex; and
0-20 wt % internally plasticized pvc latex;
0-1 wt % organic oil/silica defoamer;
0-5 wt % carbon black dispersion;
0-5 wt % EBS anti-blocking wax dispersion;
0-10 wt % acrylic solution polymer;
0-2 wt % non-ionic surfactant;
0-1 wt % fluorosurfactant; and
0-5 wt % polyacrylic acid thickener.

22. The process of claim 21, wherein said paving temperature comprises a range of at least about 250-320° F., and said coating is heated to at least about 120-150° F.

23. The process of claim 21, wherein said impregnating step (b) comprises print rolling said binder resin onto said grid.

24. The process of claim 21, wherein said applying step (c) includes print rolling said coating onto said resin-impregnated grid.

25. The process of claim 21, wherein said binder resin and said resin-impregnated grid comprise the same resinous composition.

26. The process of claim 21, wherein said coating comprises a PVC latex emulsion.

27. The process of claim 21, wherein said PVC latex emulsion also comprises 1-8 wt. % wax release agent and about 0-10 wt. % of one or more additives selected from the group consisting of: soluble polymer, ammonia, thickener, carbon black, defoamer, and plasticizer.

28. The process of claim 21, wherein the coating comprises:
45-50 wt % pvc-acrylic latex;
7-14 wt % internally plasticized pvc latex;
15-20 wt % styrene-acrylic acid latex;
12-18 wt % ethylene-acrylic acid latex;
0.1-0.3 wt % organic oil/silica defoamer;
0.5-2 wt % carbon black dispersion;
1-3 wt % EBS anti-blocking wax dispersion;
1.5-3.5 wt % acrylic solution polymer;
0.05-0.15 wt % non-ionic surfactant;
0.05-0.15 wt % fluorosurfactant; and
0.25-1.0 wt % polyacrylic acid thickener.

* * * * *